United States Patent
Salkintzis

(10) Patent No.: US 9,974,115 B2
(45) Date of Patent: May 15, 2018

(54) METHOD AND DEVICE FOR POLICY-BASED ROUTING

(71) Applicant: Google Technology Holdings LLC, Mountain View, CA (US)

(72) Inventor: Apostolis K. Salkintzis, Athens (GR)

(73) Assignee: Google Technology Holdings LLC, Mountain View, CA (US)

( * ) Notice: Subject to any disclaimer, the term of this patent is extended or adjusted under 35 U.S.C. 154(b) by 251 days.

(21) Appl. No.: 14/272,614

(22) Filed: May 8, 2014

(65) Prior Publication Data

US 2015/0188810 A1    Jul. 2, 2015

Related U.S. Application Data

(60) Provisional application No. 61/921,566, filed on Dec. 30, 2013.

(51) Int. Cl.
*H04L 12/721* (2013.01)
*H04W 80/04* (2009.01)
(Continued)

(52) U.S. Cl.
CPC ............ *H04W 80/04* (2013.01); *H04L 45/38* (2013.01); *H04W 40/00* (2013.01); *H04W 48/18* (2013.01); *H04W 88/06* (2013.01)

(58) Field of Classification Search
CPC ..... H04W 80/04; H04W 40/00; H04W 88/06; H04W 48/18; H04L 45/38
See application file for complete search history.

(56) References Cited

U.S. PATENT DOCUMENTS 7,610,621 B2 * 10/2009 Turley ................ H04L 63/0263
726/11
7,702,739 B1 * 4/2010 Cheng ..................... H04L 47/10
709/203
(Continued)

FOREIGN PATENT DOCUMENTS

| EP | 2445266 A1 | 4/2012 |
|---|---|---|
| WO | 2013040594 A1 | 3/2013 |
| WO | 2013130637 A1 | 9/2013 |

OTHER PUBLICATIONS

European Patent Office, International Search Report and Written Opinion for PCT Application No. PCT/US2014/071876 (related to above-captioned patent application), dated Jul. 30, 2015.
(Continued)

*Primary Examiner* — Andrew Lai
*Assistant Examiner* — Chuong M Nguyen
(74) *Attorney, Agent, or Firm* — Faegre Baker Daniels LLP

(57) ABSTRACT

A mobile device performs a method for policy-based routing. The method includes creating a first set of marking rules based on routing policy data provisioned in the mobile device, wherein each marking rule indicates labeling for packets, wherein the labeling is used in selecting one of a plurality of active network interfaces in the mobile device to route the packets over a set of access networks available to the mobile device. The method further includes creating a first set of routing tables corresponding to the labeling indicated by the first set of marking rules, wherein each routing table directs the mobile device to a different one of the active network interfaces of the plurality of active network interfaces.

18 Claims, 5 Drawing Sheets

(51) Int. Cl.
*H04W 40/00* (2009.01)
*H04W 48/18* (2009.01)
*H04W 88/06* (2009.01)

(56) References Cited

U.S. PATENT DOCUMENTS

| | | | | |
|---|---|---|---|---|
| 2002/0080752 | A1* | 6/2002 | Johansson | H04L 29/06 370/338 |
| 2002/0161905 | A1* | 10/2002 | Haverinen | H04L 29/06 709/229 |
| 2006/0159088 | A1* | 7/2006 | Aghvami | H04L 45/24 370/389 |
| 2007/0239854 | A1* | 10/2007 | Janakiraman | G06F 9/4856 709/218 |
| 2008/0102815 | A1* | 5/2008 | Sengupta | H04W 36/24 455/424 |
| 2008/0165779 | A1* | 7/2008 | Weiss | H04L 45/00 370/392 |
| 2008/0186852 | A1* | 8/2008 | Sami | H04L 45/00 370/235 |
| 2009/0303894 | A1* | 12/2009 | Keohane | G06Q 30/02 370/252 |
| 2011/0201285 | A1* | 8/2011 | Giaretta | H04W 48/18 455/90.2 |
| 2012/0214527 | A1* | 8/2012 | Meylan | H04L 12/5692 455/509 |
| 2013/0138766 | A1* | 5/2013 | Draluk | H04L 63/105 709/217 |
| 2013/0322300 | A1* | 12/2013 | Landais | H04L 45/302 370/259 |

OTHER PUBLICATIONS

Roke, "Policy on the Device", Roke Manor Research Limited 2012, all pages.
Qualcomm Technologies, Inc., "Connectivity Engine Overview", 80-ND697-1A, Oct. 2012, all pages.
Qualcomm CDMA Technologies, "Operator Policies with CnE-WQE", Application Note, 80-NA439-1B, Jun. 15, 2012, all pages.

* cited by examiner

METHOD AND DEVICE FOR POLICY-BASED ROUTING

RELATED APPLICATION

The present application is related to and claims benefit under 35 U.S.C. § 119(e) of the U.S. Provisional Patent Application Ser. No. 61/921,566, filed Dec. 30, 2013, titled "Method and Device for Policy-Based Routing", which is commonly owned with this application by Motorola Mobility, Inc., and the entire contents of each are incorporated herein by reference.

FIELD OF THE DISCLOSURE

The present disclosure relates generally to wireless communications and more particularly to a method and device for policy-based routing.

BACKGROUND

As it becomes more and more common for wireless communication devices to implement multiple wireless access technologies, wireless network operators are beginning to deploy different wireless access networks (also referred to in the art as radio access networks (RANs) and also referred to herein simply as access networks) that share a same core network. For example, some operators of networks that implement and/or are compliant with one or more 3$^{rd}$ Generation Partnership Project (3GPP) standards or specifications, such as Long Term Evolution (LTE) networks, are planning to integrate WiFi networks into their existing cellular network infrastructure. Such WiFi networks are termed in the standards as "trusted" WiFi networks.

To take advantage of the expansion in available wireless access network coverage, wireless communications devices are increasingly being designed with the capability of maintaining multiple active network interfaces over one or more available wireless access networks. Accordingly, the wireless communication devices should also be capable of handling routing policy or preferences, e.g., of the network operator and/or users of the device, for the multiple active network interfaces. A current technique used to support routing across different active network interfaces involves populating a routing table with suitable entries that direct the routing of packets over particular network interfaces based on an endpoint identification such as a destination Internet Protocol (IP) address. However, since wireless communication devices are being provisioned with increasingly complicated routing policies, the approach of routing packets with a single routing table based on endpoint identification is insufficient.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

Figure 1:
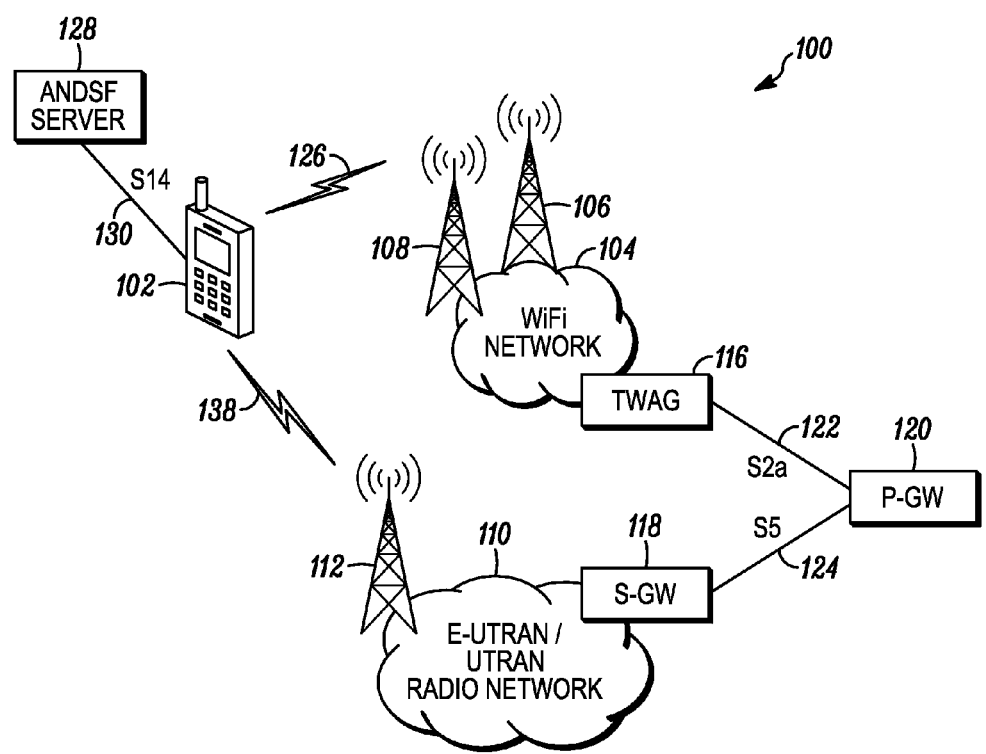
FIG. 1 is a schematic diagram illustrating a wireless communication environment in which at least one wireless communication device is configurable in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Generally speaking, pursuant to the various embodiments, are methods and a wireless communication device, also referred to herein as a mobile device, configured for policy-based routing. In accordance with one particular embodiment is a method for policy-based routing, which includes creating a first set of marking rules based on routing policy data provisioned in the mobile device. Each marking rule indicates labeling for packets, wherein the labeling is used in selecting one of a plurality of active network interfaces in the mobile device to route the packets over a set of access networks available to the mobile device. The method further includes creating a first set of routing tables corresponding to the labeling indicated by the first set of marking rules, wherein each routing table directs the mobile device to a different one of the active network interfaces of the plurality of active network interfaces.

In accordance with another embodiment is a mobile device configured for policy-based routing. The mobile device includes a memory component and a processor coupled to the memory component. The memory component is configured to store provisioned routing policy data. The processor is configure to create a first set of marking rules based on the routing policy data provisioned in the mobile device, wherein each marking rule indicates labeling for packets, wherein the labeling is used in selecting one of a plurality of active network interfaces in the mobile device to route the packets over a set of access networks available to the mobile device. The processor is further configured to create a first set of routing tables corresponding to the labeling indicated by the first set of marking rules, wherein each routing table directs the mobile device to a different one of the active network interfaces of the plurality of active network interfaces.

In accordance with at least some of the various embodiments of the present teachings, a mobile device can implement policy-based routing over multiple active network interfaces with more flexibility than possible with conventional routing mechanisms. For example, the present teachings regarding policy-based routing can easily accommodate updates to routing policy provisioned in the mobile device by a network operator through a network device or by a user of the mobile device through a user interface. Moreover, the present teachings regarding policy-based routing can also accommodate changes to the active network interfaces and changes to access networks that are available to the mobile device. In addition, the present teachings regarding policy-based routing do not require implementing complicated user-plane tasks that introduce user-plane delays (such as comparing each packet with the provisioned policy) but can be implemented by configuring a routing layer within the mobile device (i.e., the software layer that implements a protocol such as Internet Protocol, which handles packet routing), which is more efficient and requires less processing than comparing each packet with the provisioned policy and making routing decisions. Furthermore, the present teachings regarding policy-based routing can support more than destination address or endpoint identification based routing but also supports other types of routing including, but not limited to, application or source based routing, user preference based routing, etc.

Turning now to FIG. 1, illustrated therein is a schematic diagram of an example environment 100 within which may be implemented methods and devices for policy-based routing, in accordance with the present teachings. In this particular embodiment, a wireless communication device 102, which in this example is a mobile or portable device, is configured for establishing wireless links to infrastructure equipment within multiple access networks, e.g., an access network 104 and an access network 110, to, for instance, exchange data and voice communications with other mobile or portable devices or with other devices such as printers and servers. At any given point in time, the access networks that are in range of a wireless communication device and with which the wireless communication device is configured to establish wireless links are termed herein as available access networks to the wireless communication device. The two access networks 104 and 110 can use any type of access technology for a wireless communication device to access and communicate using the access network; but in one embodiment, two different access technologies are used to, respectively, communicate over the two access networks 104 and 110. Access technologies are also referred to herein as wireless access technologies and also known in the art as radio access technologies (RATs).

In this illustrative embodiment, the access network 104 is a Wireless Local Area Network (WLAN) having at least one access point, e.g., 106, 108, for facilitating wireless links, e.g., 126, using Institute of Electrical and Electronics Engineers (IEEE) 802.11 standards, also referred to in the art as WiFi technology. Thus, access network 104 is also referred to herein as a WiFi network or a WiFi access network. However, any other type of wireless access technology such as Worldwide Interoperability for Microwave Access (WiMax) or a cellular or cellular-based access technology may be implemented in the access network 104.

The access network 110 is a cellular access network, also referred to herein as a cellular network, having at least one cellular tower or base station, e.g., 112, for facilitating wireless links, e.g., 138, to the access network 110. As shown, the cellular network 110 and a core network that supports communications using the cellular network 110 are implemented using 3GPP standards also referred to herein as 3GPP specifications, for example as an LTE network. More particularly, the cellular network 110 is an Evolved UMTS Terrestrial Radio Access Network (E-UTRAN) or a legacy UTRAN having at least one eNodeB, e.g., 112, for facilitating wireless links to user equipment (UE) such as the wireless communication device 102.

In an embodiment, the cellular access network 110 uses E-UTRA as the RAT. However, any other cellular or cellular-based access technology can be used including, but not limited to: an analog access technology such as Advanced Mobile Phone System (AMPS); a digital access technology such as Code Division Multiple Access (CDMA), Time Division Multiple Access (TDMA), Global System for Mobile communication (GSM), integrated Digital Enhanced Network (iDEN), General Packet Radio Service (GPRS), Enhanced Data for GSM Evolution (EDGE), etc.; and/or a next generation access technology such as Universal Mobile Telecommunication System (UMTS), Wideband CDMA (WCDMA), IEEE 802.16, etc., or variants thereof.

The core network that supports and interconnects the WiFi network 104 and the cellular network 110 is, in this embodiment, a System Architecture Evolution (SAE) core, also referred to in the art as an Evolved Packet Core (EPC). The EPC subcomponents can include, among other subcomponents, a Mobility Management Entity (MME) not shown, a Serving Gateway (S-GW) 118, a PDN Gateway (P-GW) 120, a Home Subscriber Server (HSS) not shown, an Access Network Discovery and Selection Function (ANDSF) server 128, and an Evolved Packet Data Gateway (ePDG) not shown.

The ANDSF server 128 interfaces to the mobile device 102 using a S14 interface 130 that enables IP level communications between the ANDSF server 128 and an ANDSF client (not shown) in the mobile device 102. The cellular network 110 interfaces to the EPC using an S5 interface 124 between the P-GW 120 and the S-GW 118. In the present embodiment, the WiFi network 104 is implemented as a trusted WiFi network and, therefore, includes a Trusted WiFi Access Gateway (TWAG) 116. The WiFi network 104 interfaces to the EPC using an S2a interface 122 between the P-GW 120 and the TWAG 116. The 3GPP interfaces, also referred to in the 3GPP specifications as reference points, and the 3GPP EPC subcomponents and other 3GPP network devices, e.g., the TWAG 116, shown in FIG. 1 are well known and are specified in various 3GPP specifications. Therefore, details of their functionality, operation, construct, and/or implementation are omitted herein for the sake of brevity.

As shown, the wireless communication device 102 maintains two physical wireless links used to support one or more active communication sessions in order to communicate data such as video and/or voice. More particularly, the wireless communication device 102 has a wireless link 126 to the access point 108 in the WiFi network 104 to communicate data using the WiFi network 104; and the wireless communication device 102 has a wireless link 138 to the base station 112 in the cellular network 110 to communicate data using the WiFi network 110.

In an embodiment, the link 126 supports a direct WLAN connection, which refers to a layer 3 or network layer connection that corresponds to and is implemented using a network or data interface (for instance an Internet Protocol (IP) interface having associated therewith an IP address), for non-seamless WLAN offload routing through the WiFi network 104. The link 126 may also support a packet data network (PDN) layer 3 connection that corresponds to and is implemented using a separate data interface for access point name (APN) routing through the WiFi network 104. More particularly, as shown and described in more detail by reference to FIG. 3, the mobile device 102 can have multiple active network or data interfaces using the single physical WiFi link 126: one direct interface (such as a Direct WLAN interface 350 shown in FIG. 3 corresponding to a Direct WLAN connection) and zero or more virtual private network (VPN) interfaces (such as a WLAN PDN interface 352 shown in FIG. 3 corresponding to a WLAN PDN connection). The direct interface is created when the mobile device 102 connects to and establishes the physical link 126 using the access point 108. A VPN interface (WLAN PDN) can be created later to establish a logical layer 3 connection between the mobile device 102 and a Packet Data Network (PDN) connected to a P-GW, e.g., 120 of FIG. 1, in the core network (EPC). A PDN can be, for example, an enterprise network, an IP Multimedia Subsystem (IMS), the Internet, etc. Accordingly, as used herein: a link refers to a physical connection; a layer 3 or network connection refers to a logical connection (that may be represented by an APN, security methods, an IP address, etc.) used by the mobile device 102 to route data packets using a particular network (which may include a particular PDN) using a given physical link; and a data, network, or VPN interface refers to a logical construct that the mobile device uses which corresponds to and facilitates routing using a given network connection. As such, a layer 3 connection and its corresponding data interface may be referred to herein interchangeably.

All packets that go to the direct interface (Direct WLAN) are delivered to the WLAN 104, which then routes them forward. On the contrary, all packets that go to a VPN interface (WLAN PDN) are forwarded to a P-GW in the EPC, which then forwards them to an external PDN. In other words: packets sent to the direct interface do not traverse EPC (are offloaded directly to the WLAN 104); and packets sent to a WLAN PDN interface go to EPC. Note that traffic sent to the direct interface is interrupted when WiFi is lost (cannot be handed over to EPC), hence this traffic is called "non-seamless WLAN offload" traffic. However, traffic sent to a WLAN PDN interface can be seamlessly handed over to UTRAN/E-UTRAN when the WiFi is lost, hence this traffic is called "seamless WLAN offload" traffic. In accordance with the teachings herein, methods can be performed by the wireless communication device 102 for policy-based routing over a plurality of active network interfaces, for example over multiple active network interfaces corresponding to the wireless links 126 and 138.

Figure 2:
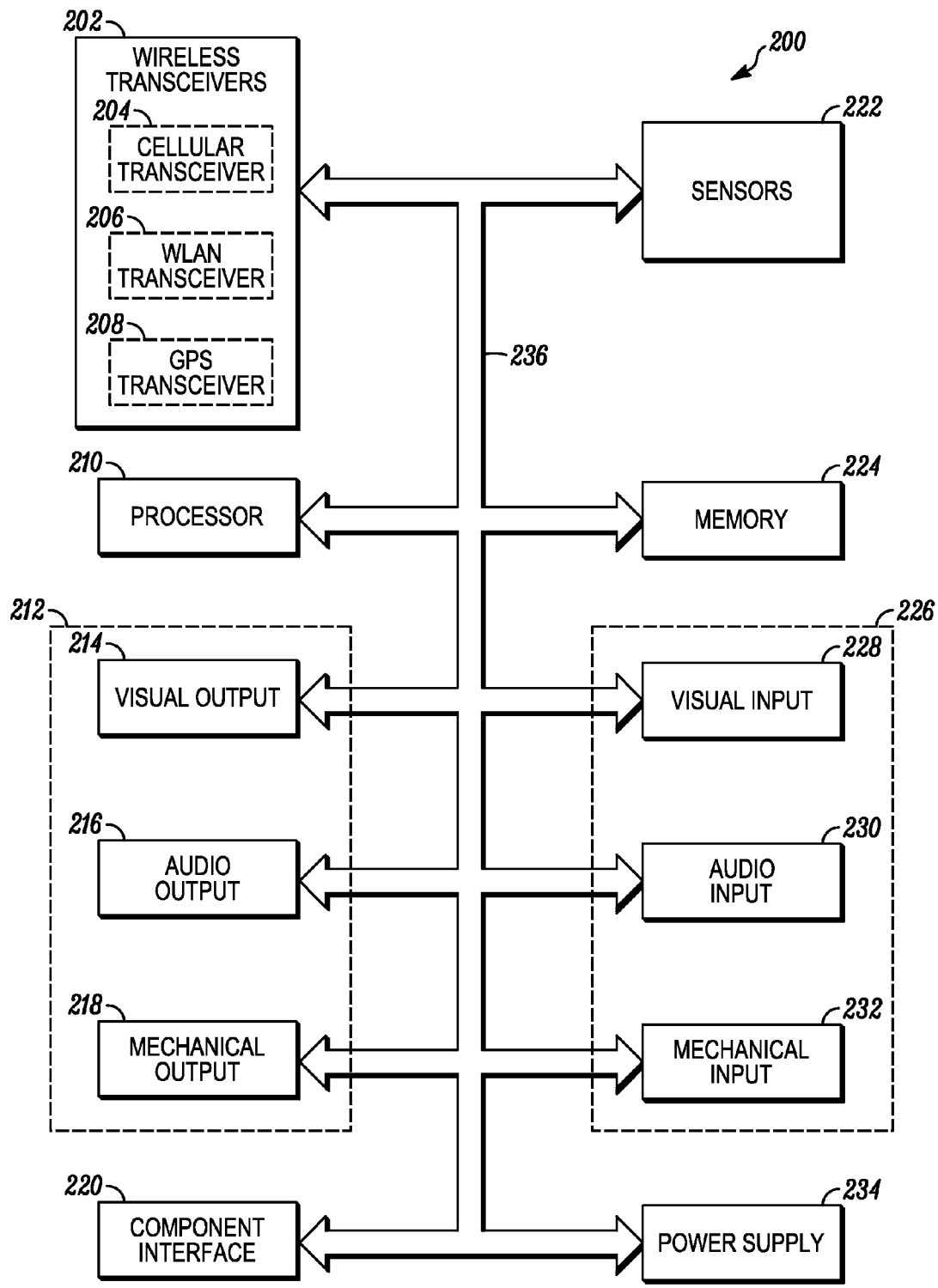
FIG. 2 is a block diagram illustrating internal hardware components of a wireless communication device configured in accordance with some embodiments.

Referring now to FIG. 2, there is provided a block diagram illustrating example internal hardware components 200 of the wireless communication device 102 of FIG. 1, in accordance with the present embodiment. The wireless communication device 102 is intended to be representative of a variety of mobile devices or UE including, for example, cellular telephones, personal digital assistants (PDAs), smart phones, laptop computers, tablets, phablets, or other handheld or portable electronic devices. As shown in FIG. 2, the internal hardware elements or components 200 include one or more transceivers 202, one or more processors 210, output components 212, a component interface 220, one or more sensors 222, a memory component 224, input components 226, and a power supply 234. As further illustrated, the internal components 200 are coupled to one another, and in communication with one another, by way of one or more internal communication links 236, for instance an internal bus. A limited number of device components 202, 210, 212, 220, 222, 224, 226, and 234 are shown at 200 for ease of illustration, but other embodiments may include a lesser or greater number of such components in a device, such as device 102. Moreover, other elements needed for a commercial embodiment of a device that incorporates the components shown at 200 are omitted from FIG. 2 for clarity in describing the enclosed embodiments.

We now turn to a brief description of the components within the schematic diagram 200. In general, the processor 210 and memory 224 may be configured with functionality in accordance with embodiments of the present disclosure as described in detail below with respect to the remaining FIGS. 3-5. "Adapted," "operative," "capable" or "configured," as used herein, means that the indicated components are implemented using one or more hardware elements, which may or may not be programmed with software and/or firmware as the means for the indicated components to implement their desired functionality. Such functionality is supported by the other hardware shown in FIG. 2, including the device components 202, 212, 220, 222, 226, and/or 234.

Continuing with the brief description of the device components shown at 200, as included within the device 102, the wireless transceivers 202 include a cellular transceiver 204, a WLAN transceiver 206, and a Global Positioning System (GPS) transceiver 208. More particularly, the cellular transceiver 204 is configured to implement any suitable cellular or cellular-based technology to conduct cellular communications of data over a cellular network, such as the cellular network 110. The WLAN transceiver 206 is a WiFi transceiver 206 configured to conduct WiFi communications over a WiFi network, such as the WiFi network 104, in accordance with the IEEE 802.11 (a, b, g, n or ac) standard.

The processor 210 includes arithmetic logic and registers necessary to perform the digital processing required by the device 102 to, for example, perform policy-based routing in a manner consistent with the embodiments described herein. For one embodiment, the processor(s) 210 represent a primary microprocessor or central processing unit (CPU) of the device 102 such as an application processor of a smartphone 102. In another embodiment, the processor(s) 210 represent a baseband processor or other ancillary or standalone processor to the CPU that is used by one or more of the wireless transceivers 202 to provide the processing capability, in whole or in part, needed for the device 102 to perform its intended functionality including wireless transmissions to facilitate the device's operation in accordance with the present teachings, for instance by reference to the flow diagrams shown in FIGS. 4-5. Depending at least in part on the particular function being performed and a given device 102 design, various functionality or protocols may be executed by the processor 210 in hardware or as software or firmware code.

In the embodiment shown, the output components 212 include: one or more visual output components 214 such as a liquid crystal display and/or light emitting diode indicator; one or more audio output components 216 such as a speaker, alarm, and/or buzzer; and one or more mechanical output components 218 such as a vibrating mechanism. Similarly, the input components 226 include one or more visual input components 228 such as a camera lens and photosensor; one or more acoustic receiver or audio input components 230 such as one or more transducers (e.g., microphones), including for example a microphone array and beamformer arrangement or a microphone of a Bluetooth headset; and one or more mechanical input components 232 such as a touchscreen display, a flip sensor, keyboard, keypad selection button, and/or switch.

As mentioned above, this embodiment of internal components 200 also includes one or more of various types of sensors 222 as well as a sensor hub to manage one or more functions of the sensors. The sensors 222 include, for example, proximity sensors (e.g., a light detecting sensor, an ultrasound transceiver or an infrared transceiver), touch sensors, altitude sensors, an accelerometer, a tilt sensor, and a gyroscope, to name a few.

The memory component 224 encompasses, in some embodiments, one or more memory elements of any of a variety of forms, for example read-only memory, random access memory, static random access memory, dynamic random access memory, etc. In an embodiment, the processor 210 uses the memory component 224 to store and retrieve data. In some embodiments, the memory component 224 is integrated with the processor 210 into a single component such as on an integrated circuit. However, such a single component still usually has distinct portions/sections that perform the different processing and memory functions.

The data that is stored by the memory component 224 includes, but need not be limited to, operating systems, programs (e.g., applications, protocols, and other code), and informational data. Each operating system includes executable code that controls basic functions of the wireless communication device 102, such as interaction among the various components included among the internal components 200, communication with external devices via the wireless transceivers 202 and/or the component interface 220, and storage and retrieval of programs and data, to and from the memory component 224. As for programs, each program includes executable code that utilizes an operating system to provide more specific functionality, such as file system service and handling of protected and unprotected data stored in the memory component 224. Such programs include, among other things, programming for sending and receiving various data such as voice and/or video and for enabling the wireless communication device 102 to perform methods or processes such as described below by reference to FIGS. 3-5. Finally, with respect to informational data, this is non-executable code or information such as routing policy data that an operating system or program references and/or manipulates, in one embodiment, for performing functions of the wireless communication device 102.

In an embodiment, the component interface 220 provides a direct physical connection to auxiliary components such as a docking station or printer or accessories for additional or enhanced functionality. For example, the component interface can be implemented as one or more Universal Serial Bus (USB) ports, RS-232 or other serial connectors, etc. The power supply 234, such as a battery, provides power to the other internal components 200 while enabling the wireless communication device 102 to be portable.

Figure 3:
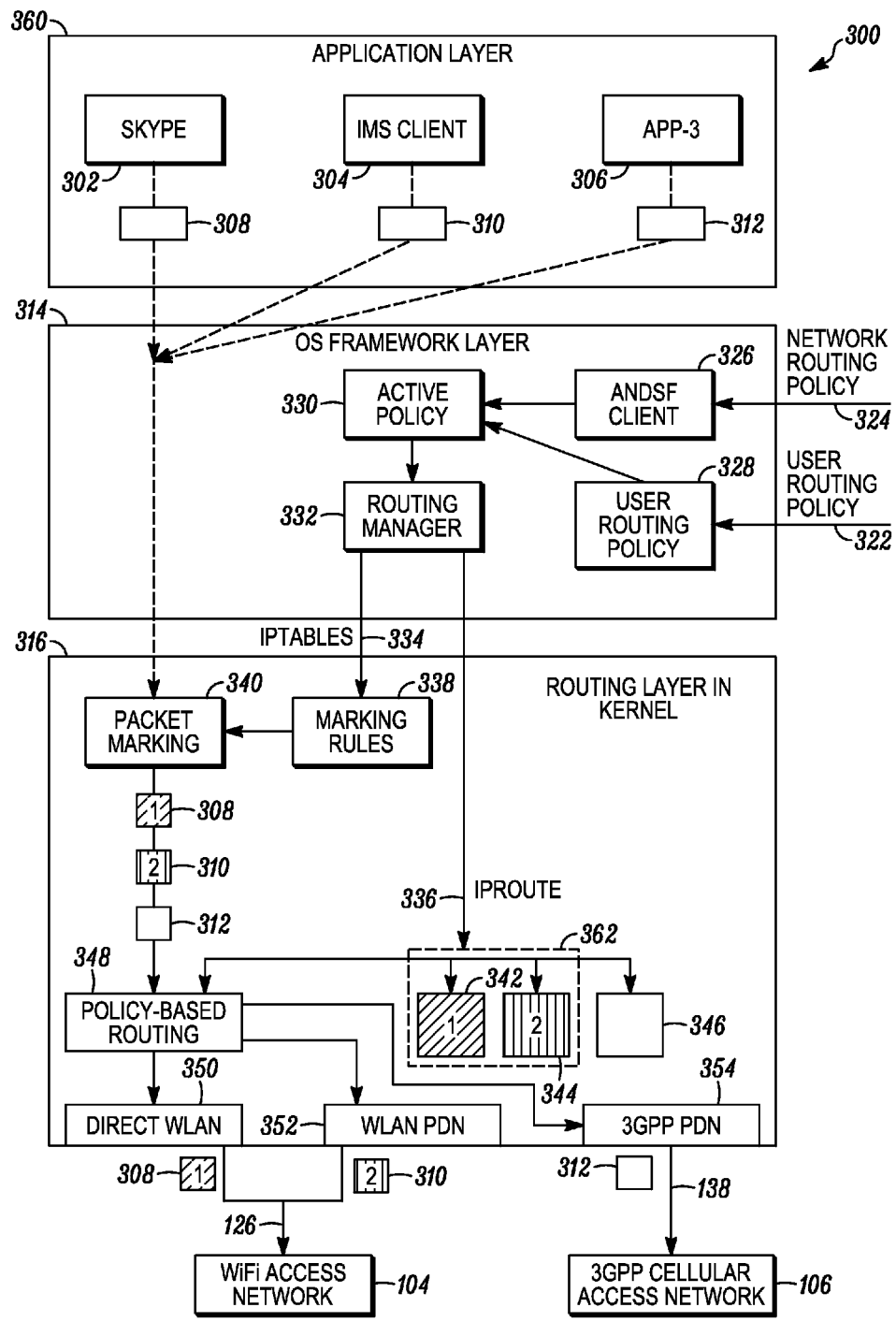
FIG. 3 is a block diagram illustrating a logical construct of software, within a wireless communication device, which is executable to perform policy-based routing in accordance with some embodiments.

FIG. 3 is a block diagram illustrating functional aspects of the present teachings including, but not limited to, programs and corresponding informational data that can be stored in memory and executed by a processor within a wireless communication device, such as the device 102 of FIG. 1. More particularly, FIG. 3 shows at 300 an example implementation of a protocol stack or protocol suite having multiple "layers" that each have, include, contain, or implement one or more protocols, procedures, and/or algorithms that enable various functionality of the wireless communication device 102 in accordance with the present disclosure illustrated, for instance, by reference to FIGS. 3-5. In one embodiment, the protocol stack shown at 300 is executed by one or more processors 210 using protocols, procedures, algorithms, and informational data (such as provisioned routing policy and marking rules and corresponding routing tables created in accordance with the present teachings), stored in the memory component 224.

The protocol stack shown at 300 includes three layers or sections: (a) an application layer 360; (b) an OS framework layer 314; and (c) a routing layer 316. The protocol stack can include other layers not shown, for instance other layers corresponding to an Open System Interconnection (OSI) model of networking or corresponding to an Internet Protocol suite. Such layers include, for example, a physical layer, a data link or link layer, a transport layer, a session layer, or a presentation layer.

The application layer 360 contains various applications including, but not limited to, a Skype application (app) 302, an IMS-based application 304 (also referred to herein as an IMS client) that supports voice or video over IP, file sharing, etc., and a third application APP-3 306, e.g. a Multimedia Messaging Service (MMS) application. Applications 302, 304, and 306 initiate the establishment of an active communication session, for instance a voice call by the Skype application 302 and a video session by the IMS client 304. An active communication session occurs between specific points in time when the session is established and torn down using the requisite signaling to enable ongoing communication of traffic between two endpoints. The traffic can be in the form of data chunks referred to herein generally as packets. During an active communication session, an application generates outgoing traffic or packets that are provided to and/or forwarded using one of a plurality of active network interfaces selected in accordance with the present teachings for routing the packets to an endpoint over the access network associated with and/or identified by the selected access network interface.

The OS framework layer 314 implements a set of functions that support the communication between the application layer 360 and, at least, a transport layer (not shown). Layer 314 enables the applications 302, 304, 306 to utilize the transport services provided by the transport layer and also to utilize other services provided by other layers not shown in FIG. 3. Such services may include location services, media rendering services, content encoding, presentation services, etc. The Operating System (OS) framework layer 314 includes an ANDSF client 326 having functionality for communicating with an ANDSF server, such as the ANDSF server 128 shown in environment 100 of FIG. 1, in accordance with the 3GPP specifications, e.g., Technical Specification (TS) 24.312 and TS 23.402 clause 4.8. The OS framework layer 314 further includes a routing manager 332 in accordance with the present teachings, as described in detail later.

The routing layer 316, also referred to as a network layer of the OSI model and as the Internet layer of an Internet Protocol suite, enables packets to be effectively routed through a set of, meaning one or more, access networks. In this particular embodiment, the routing layer 316 is an IP layer in a Linux kernel. The routing layer 316 includes a packet marking function 340 and a policy-based routing function 348 to implement policy-based routing in accordance with the present teachings, as explained in detail later. The remaining couplings or interfaces between the components and layers of the protocol suite shown at 300 and the corresponding functionality of such components is described by reference to flow diagrams illustrated in FIGS. 4 and 5.

Figure 4:
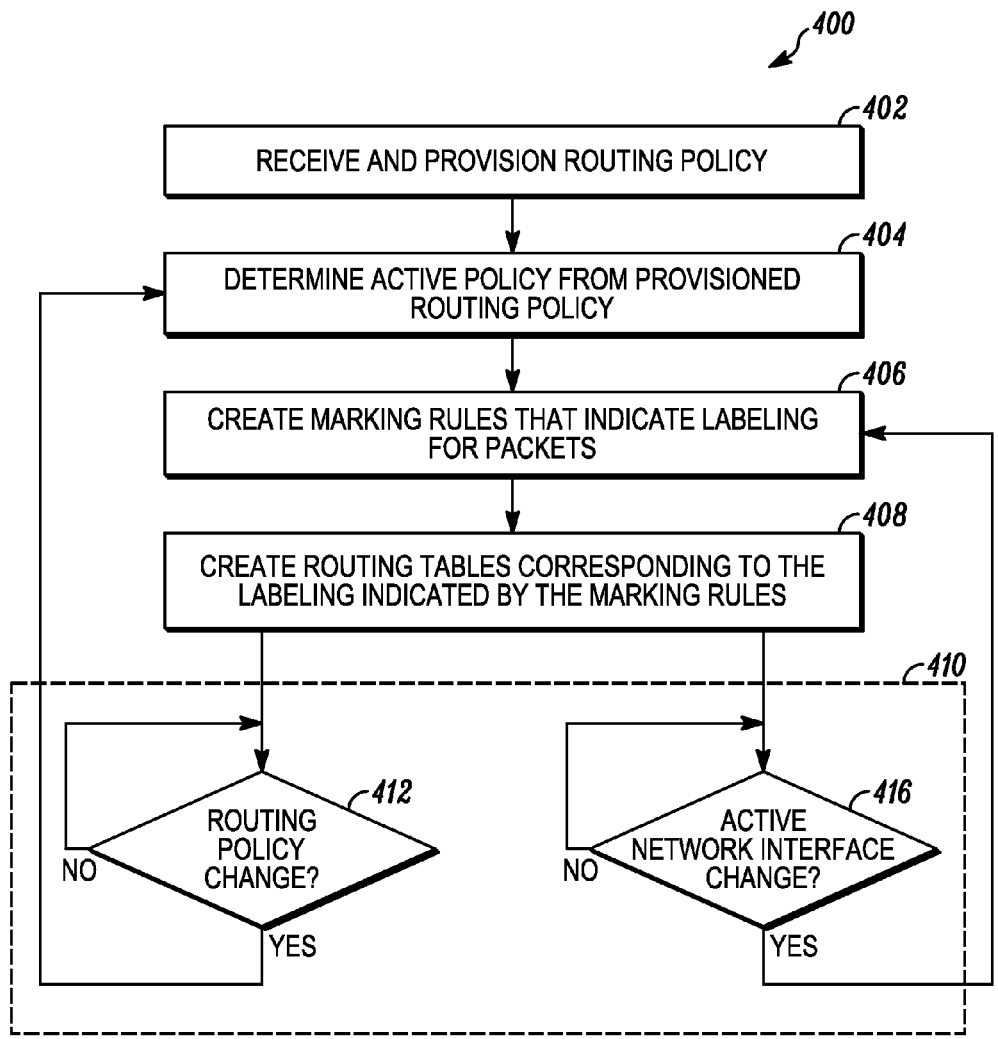
FIG. 4 is a flowchart illustrating a method for facilitating policy-based routing in accordance with some embodiments.
Figure 5:
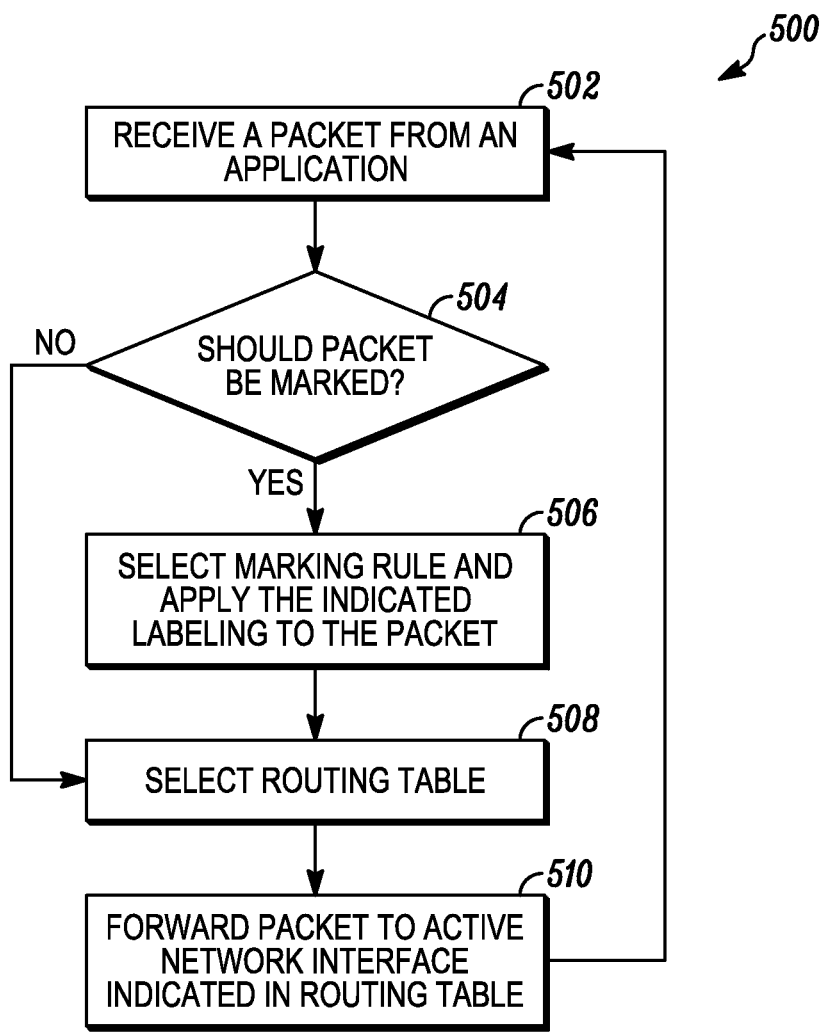
FIG. 5 is a flowchart illustrating a method for facilitating policy-based routing in accordance with some embodiments.

We turn now to a detailed description of the functionality of the device 102 of FIG. 1 and device components 200 of FIG. 2 implementing protocols, procedures, and/or algorithms in accordance with the teachings herein illustrated by reference to FIGS. 4 and 5 and by further reference to aspects illustrated in FIG. 3. FIGS. 4 and 5 show logical flow diagrams illustrating general methods 400 and 500, respectively, performed by a device, such as the device 102, for policy-based routing in accordance with the present teachings. More particularly, FIG. 4 is directed to a method 400 that can be implemented to configure the routing layer 316 for policy-based routing over multiple active network interfaces based on routing policy data provisioned in the mobile device 102. FIG. 5 is directed to a method 500 that can be implemented to route packets using the routing layer configurations resulting from implementing method 400. In a particular implementation, at least some portions of the methods 400 and 500 are performed using at least one processor 210 and the memory 224 of the device 102.

Turning now to the details of method 400 (also described by reference to aspects of FIG. 3), the mobile device 102 receives 402 and is, thereby, provisioned with routing policy data. Routing policy data also referred to herein interchangeably as routing policy, as used herein, includes one or more rules that identify network operator (operator) and/or mobile device user preferences of access networks to route certain application traffic. In one embodiment, the routing policy data includes user directed policy 328 that is provisioned 322 in the mobile device 102 through a user interface of the mobile device 102, e.g., one or more of the input components 226. For example, a user can set preferences for using a WiFi network or a cellular network for particular applications. In another embodiment, the routing policy data is provisioned using an interface to a network device within a core network that supports the set of access networks available to the mobile device.

For example, an ANDSF client 326 within the OS framework layer 314 of the mobile device 102 can be provisioned 324 with network or operator routing policy over the S14 interface 130 to the Access Network Discovery and Selection Function server 128 of the Evolved Packet Core of a $3^{rd}$ Generation Partnership Project compliant network. In accordance with the 3GPP specifications, the ANDSF client 326 can be provisioned 324 by the ANDSF server 128 with ANDSF policies including Inter-APN Routing Policy (IARP) and/or Inter-System Routing Policy (ISRP). The IARP contains interface selection policies for selecting an IP interface to route packets among a choice of available IP interfaces in both 3GPP and non-3GPP access networks. The ISRP contains interface selection rules (similar to IARP) for traffic distribution for different types of traffic flows from different types of applications over different access networks for mobile devices that are configured for various features as defined in the 3GPP specifications. All these policies can be valid in any location and time or can be valid in a given location and/or for a given time.

In accordance with the described embodiment, a set of one or more routing policies of a plurality of routing policies provisioned in the mobile device 102 is selected 404 based on the selection criteria defined in 3GPP specifications to be an active routing policy 330 used by the mobile device 102. The active routing policy 330 is the routing policy that the mobile device 102 applies, to the exclusion of other possible routing policies provisioned in the mobile device 102, to control how packets are routed across the active network interfaces, for instance, during a particular time period and/or within a given location area. The active routing policy data 330 can be based on or selected from the network routing policy 324, the user routing policy 328, or both, which is provisioned in the mobile device 102. In the 3GPP specifications for instance, ISRP rules have a number of validity conditions, e.g. time of day and location, that may be set and would, therefore, need to be met or satisfied in order for the mobile device 102 to select the ISRP as the active routing policy 330. The ISRP rules also have a number of results, e.g., preferred access technology and restricted access technology for type of traffic, that the mobile device 102 should implement when a given ISRP rule is active in order to route this type of traffic in compliance to the ISRP rule. IAPR rules also have validity conditions, such as validity area and time of day, and associated results when an IARP rule is selected as the active routing policy.

Returning again to method 400 of FIG. 4, the routing manager 332 of mobile device 102 creates 406 a set of one or more marking rules 338 based on the active routing policy 330 in the mobile device 102. The routing manager 332 further creates 408 a set of one or more routing tables 362 corresponding to packet labeling indicated by the set of marking rules. Each routing table directs packets to a different one of the active network interfaces of a plurality of active network interfaces in the mobile device 102.

A marking rule specifies or indicates a manner in which to mark or label a packet, wherein the labeling is used to facilitate selecting one of a plurality of active network interfaces in a mobile device for routing packets over a set of access networks available to the mobile device. A routing table lists a path, in this case a particular IP interface, for routing packets through the access network which supports the IP interface.

Where the routing layer is implemented as an IP layer in a Linux kernel, as shown in FIG. 3, the routing manager 332 can use commands and/or applications that are compatable with Linux to create the marking rules 338 and to create and enforce the routing tables 362. In a particular embodiment, the routing manager 332 creates the set of marking rules 338 using an iptables command 334 to specify how to mark or label the packets that are, for instance, deemed by the mobile device 102 as requiring marking in accordance with the active routing policy 330. Moreover, in this Linux implementation, the routing manager 332 configures the corresponding set of routing tables 362 using an ip route command 336, which is part of a collection of utilities for controlling IP networking in Linux. However, any suitable applications, commands, and/or utilities can be used to create the marking rules 338 and corresponding routing tables 362, based at least in part on the particular OS implementation in the mobile device 102.

Turning back to the method 400 of FIG. 4, a benefit of the present teachings is the ability to dynamically re-configure the routing layer 316 to enforce changes to the policy-based routing, which results, for instance, from an active network interface change 416 for the mobile device 102 and/or updates or changes 412 to the routing policy for the mobile device 102. At 410, the mobile device 102 monitors the conditions at 412 and 416 and where the mobile device 102 detects changes with respect to any one or more of these conditions, the mobile device 102 makes appropriate changes or updates, where needed, to the active routing policy at 404, the marking rules at 406, and/or the corresponding routing tables at 408.

In an embodiment, condition 416 is satisfied: when a new active network interface is created because the mobile device 102 connects to a new access network (e.g., WLAN); and when the mobile device 102 creates a new VPN connection (e.g. a WLAN PDN or 3GPP PDN connection) over an already connected access network. Condition 416 is also satisfied when an active network interface is terminated. When 416 is satisfied, the mobile device 102 creates new marking rules and routing tables. The condition 412 is satisfied: when the mobile device enters an area (or time of day) in which some policy rules become valid and possibly others become invalid; when new network routing policy 324 is received by the ANDSF client 326; or when new user routing policy 322 is configured based on user input. When 412 is satisfied, the mobile device 102 derives new active policy and creates new marking rules and routing tables.

For example, the mobile device 102 detects a change 416 in active network interfaces when the device 102 moves into or out of a coverage area for an access network and connects to or disconnects from this access network. One illustrative scenario is where a user is a passenger in an automobile and has cellular data coverage over the cellular network 110 using the link 138. When the user arrives at a coffee shop, the mobile device 102 discovers and connects to a WiFi network 104, which is provided by the coffee shop. This creates a direct WLAN 350 interface in the mobile device. Accompanying the creation of this new interface, the routing manager 332 might, in response to detecting the change in the active network interfaces, create 406 updated marking rules 338 based on the active routing policy 330 and also create 408 corresponding updated routing tables 362 based on the labeling indicated by the updated marking rules 338.

Moreover, upon moving within the coverage area of the WiFi network 104, the mobile device 102 could thereafter form one or more PDN connections over the WiFi network 104 and form one or more corresponding active network interfaces 352, thereby satisfying condition 416. For instance, the mobile device 102 can form a PDN connection to IMS in order to access IMS services over WiFi. In an alternative scenario, the mobile device 102 releases an existing PDN connection over the WiFi network 104 and deletes the accompanying active network interface 352. In either scenario, the routing manager 332 might create 406 updated marking rules 338 based on the updated routing policy 330 and also create 408 corresponding updated routing tables 362 based on the labeling indicated by the updated marking rules 338.

In another implementation scenario, the mobile device 102 periodically re-evaluates the provisioned ANDSF routing rules to determine when the active policy 330 must be updated. When, for example, the mobile device 102 enters a new location area, some routing rules may become valid and some other rules may become invalid. Thus, the mobile device 102 might detect a change in the routing policy provisioned in the mobile device 102 based on a change in its location and re-evaluate the routing policy data to select or determine updated active routing policy data. In an additional example use case, when the ANDSF server 128 provides new network routing policy 324, the mobile device 102 determines an updated active policy 330 based on the new network routing policy 324. Correspondingly, the routing manager 332 might create 406 updated marking rules 338 based on the updated routing policy and also create 408 corresponding updated routing tables 362 based on the labeling indicated by the updated marking rules 338.

Turning again momentarily to FIG. 3, next described is a particular use case scenario wherein the mobile device 102 configures the routing layer 316 by creating marking rules 338 and corresponding routing tables 362, in accordance with the present teachings using, for instance, the method 400 described above. During a given time frame and within a given location, the mobile device 102 has, as mentioned above, established: the connection for direct WLAN offload routing of packets through the WiFi access network 104 and the PDN connection using the IMS APN for routing packets to the IMS subsystem through the WiFi access network 104 and EPC; and the PDN connection using the MMS APN for routing packets corresponding to MMS messaging through the cellular access network 110. The mobile device 102 has accordingly established the direct WLAN active network interface 350 and the WLAN PDN active network interface 352 corresponding to and associated with the link 126, and a 3GPP PDN active network interface 354 corresponding to and associated with the link 138.

With further regard to this use case scenario, the ANDSF server 128 has pushed to the ANDSF client 326 of the mobile device 102 an IARP that contains two rules: (1) a rule for APN routing, e.g., ForApn-1; and (2) a rule for non-seamless WLAN offload routing, e.g., ForNswo-1. The ForApn-1 rule indicates that traffic from an IMS client (e.g., 304) and traffic to port 5060 should be routed to the IP interface (the active network interface) corresponding to the IMS APN connection and should not be routed to the IP interface corresponding to an MMS APN. The ForNswo-1 rule indicates that traffic from a Skype application (e.g., 302) and traffic to port 80 or 443 should be routed to the IP interface corresponding to the direct WLAN connection.

Using its active policy selecting algorithm, the mobile device 102 selects the IARP containing the ForApn-1 and ForNswo-1 rules as the active routing policy 330. To enforce this active routing policy, the routing manager 332 in the mobile device 102 creates a set of two marking rules, wherein each marking rule in the set of marking rules indicates a different marking value to serve as labeling for applying to packets. A marking value can be or can indicate any alpha-numeric value applied, added, and/or affixed to a packet. Where IP encapsulation is used, for example, the marking value indicates labeling that is other than an identifier for a particular endpoint. Accordingly, the marking value is not and does not indicate a particular IP address, destination address, port, MAC address, or any other addressing or destination identification mechanism from which an identity of a particular endpoint could be ascertained. Moreover, the marking value does not change the packet headers (e.g. the Transmission Control Protocol (TCP) or IP headers) and the payload information in the packet. It is only a value associated with the packet for as long as the packet remains in the routing layer 316 of the mobile device 102.

For example, the mobile device 102 creates a first marking rule to enforce the ForNswo-1 rule, wherein the first marking rule specifies that packets generated by the Skype application 302 and packets to ports 80 and 443 are marked with a value of 1. Similarly, the mobile device 102 creates a second marking rule to enforce the ForApn-1 rule, wherein the second marking rule specifies that packets generated by the IMS client 304 and packets to port 5060 are marked with a value of 2. As can be seen with respect to this use case, at least some of the routing policy data provisioned in the mobile device 102 and used to create the set of marking rules indicates routing policy based on a type of application that generates the packets. This was not possible using prior art routing tables that facilitated routing based on destination address related encapsulation.

In connection with generating the marking rules 338, the routing manager 332 of the mobile device 102 further creates a set of routing tables 362 that correspond to the labeling indicated by the set of marking rules 338. Each routing table directs the mobile device to a different one of the active network interfaces of the plurality of network interfaces 350, 352, and 354. In one example implementation, each routing table in the set of routing tables 362 indicates a single default route for a different one of the active network interfaces of the plurality of active network interfaces. A default route means that the packets to which the routing table is applied are sent to the same active network interface irrespective of the application(s) that generated the packets or the endpoint identification, e.g., destination address, or any other attribute of the packets. Moreover, in a further example implementation, each routing table in the set of routing tables 362 directs the mobile device to a different one of the active network interfaces of the plurality of active network interfaces based on a different one of the marking values indicated by the set of marking rules.

In this case, there are two marking rules in the set of marking rules. Accordingly, the mobile device 102 creates two routing tables 342 and 344 in the set of routing tables 362. More particularly, since the first marking rule labels packets that should be routed to the IP interface corresponding to the direct WLAN connection using the link 126, a routing table 342 is created that directs the packets labeled with the marking value 1 to the direct WLAN active network interface 350 as the default route for routing packets using the WiFi access network 104. Similarly, since the second marking rule labels packets that should be routed to the IP interface corresponding to the IMS APN connection using the link 126, a routing table 344 is created that directs the packets labeled with the marking value 2 to the WLAN PDN active network interface 352 as the default route for routing packets using the WiFi access network 104.

In a further embodiment, the set of routing tables 362 are created in addition to one or more routing tables 346 used to route packets that are not labeled with a marking value or otherwise labeled by a marking rule. The routing table 346 could be configured to select an active network interface (e.g. 350, 352, 354) based on the endpoint identification, such as by destination IP address and/or port number, affixed to the encapsulated IP packet. The routing table 346 is configured to route packets that do not match any of the routing rules in the active policy 330. In most cases, this routing table selects an active interface to route a packet based on the destination IP address in this packet.

Turning now to FIG. 5, wherein is illustrated a method 500 that can be used to route packets from multiple applications, e.g., 302, 304, 306, to the appropriate active network interfaces, e.g., 350, 352, 354, in the mobile device 102 using the marking rules 338 and routing tables 362 configured in accordance with the present teachings, e.g., configured based on the ForApn-1 and ForNswo-1 rules. The method 500 is also described by reference to aspects of FIG. 3. More particularly, FIG. 3 shows the Skype application 302 generating packets 308, the IMS client 304 generating packets 310, and the application APP-3 306 generating packets 312. The packet marking function 340 in the routing layer 316 of the mobile device 102 receives 502 the packets 308, 310, and 312 and accesses the marking rules 338 to determine 504 whether and how a particular packet should be marked.

In general, in determining 504 that a particular packet should be marked, the packet marking function 340 selects the appropriate marking rule and applies 506 the indicated labeling to the packet. Specifically, upon receiving the packets 308 from the Skype application 302, the packet marking function 340 selects 506 the first marking rule, and applies the marking value 1 to the packets 308. Similarly upon receiving the packets 310 from the IMS client 304, the packet marking function 340 selects 506 the second marking rule, and applies the marking value 2 to the packets 310. The marked packets 308 and 310 are passed to the policy-based routing function 348. Where the packet marking function 340 determines 504 to route a packet, e.g., the packets 312 from the application 306, without marking the packets using the marking rules, the unmarked packets 312 are simply passed through to the policy-based routing function 348.

The policy-based routing function 348, in general, selects 508 the appropriate routing table for a given packet, and routes 510 the packet using the active network interface indicated by the routing table. For packets that were labeled by the packet marking function 340, the policy-based routing function 348 selects a routing table from the set of routing tables 362 based on the labeling applied to the packet and then routes the packet using the active network interface indicated by routing table. For unmarked packets, the policy-based routing function 348 routes the packets using a routing table not included within the set of routing tables 362, which correspond to the marking rules 338. For example, the policy-based routing function 348 routes the packets using the routing table 346. Where the routing layer 316 is an IP layer in a Linux kernel, as illustrated in FIG. 3, the policy-based routing function 348 is configured with the ip route command to select the appropriate routing table for a packet based on the marking value of the packet, if the packet is marked, or to select an alternative routing table (e.g. 346) if the packet is unmarked.

With respect to the particular use case scenario herein described, for packets that were labeled by the packet marking function 340, the policy-based routing function 348 selects a routing table from the set of routing tables 362 based on the labeling applied to the packet and then routes the packet using the active network interface indicated by the selected routing table. Specifically, upon receiving the packets 308 from the Skype application 302, the policy-based routing function 348 selects 508 the routing table 342 based on the marking value 1 applied to the packets 308. The association or correspondency between the marking value 1 and the routing table 342 is indicated by the similar hashing and the number "1" within the packets 308 and the routing table 342. The routing table 342 indicates to the policy-based routing function 348 to forward 510 the packets 308 labeled with the marking value 1 to the direct WLAN active network interface 350 for routing the packets 308 over the WiFi access network 104 using the link 126.

Similarly, upon receiving the packets 310 from the IMS client 304, the policy-based routing function 348 selects 508 the routing table 344 based on the marking value 2 applied to the packets 310. The association or correspondency between the marking value 2 and the routing table 344 is indicated by the similar hashing and the number "2" within the packets 310 and the routing table 344. The routing table 344 indicates to the policy-based routing function 348 to forward 510 the packets 310 labeled with the marking value 2 to the WLAN PDN active network interface 352 for routing the packets 310 over the WiFi access network 104 using the link 126. Upon receiving the unmarked packets 312 from the application 306, the policy-based routing function 348 selects 508 the routing table 346 and, responsively, forwards 510 the unmarked packets 312 to any active network interface based on the destination IP address in these packets. The routing table 346 is configured to route packets associated with MMS messaging (i.e. those with destination IP address the IP address of the MMS proxy) to the 3GPP PDN active network interface 354 over the 3GPP cellular access network 110 using the link 138.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method for policy-based routing by a mobile device, the method comprising:

creating a first set of marking rules based on routing policy data provisioned in the mobile device, wherein each marking rule in the first set of marking rules indicates labeling for packets, wherein each marking rule in the first set of marking rules indicates a different marking value for applying to the packets, and wherein the labeling is applied to the packets and used in selecting one of a plurality of different active network interfaces in the mobile device to route the packets over a set of access networks available to the mobile device, wherein each marking rule in the first set of marking rules is used to select a different one of the active network interfaces of the plurality of different active network interfaces; and creating a first set of routing tables corresponding to the labeling indicated by the first set of marking rules, wherein each routing table directs the mobile device to a corresponding different one of the active network interfaces of the plurality of different active network interfaces, and wherein each routing table in the first set of routing tables directs the mobile device to a different one of the active network interfaces of the plurality of active network interfaces based on a different one of the marking values indicated by the first set of marking rules.

2. The method of claim 1 further comprising:

receiving a first packet from an application in the mobile device;

selecting a first marking rule from the first set of marking rules and applying the indicated labeling to the first packet;

selecting a first routing table from the first set of routing tables based on the indicated labeling applied to the first packet; and routing the first packet using an active network interface indicated by the first routing table.

3. The method of claim 2, wherein creating the first set of marking rules is performed using an iptables command, and selecting the first routing table and routing the first packet using the active network interface indicated by the first routing table is performed using an ip route command.

4. The method of claim 1, wherein each marking rule in the first set of marking rules indicates labeling for packets without changing headers or payload of the packets.

5. The method of claim 1, wherein the first set of marking rules and corresponding first set of routing tables are created based on active routing policy data selected from the routing policy data provisioned in the mobile device.

6. The method of claim 5, wherein the routing policy data includes user routing policy that is provisioned using a user interface, the method further comprising selecting the active routing policy data from the user routing policy.

7. The method of claim 5, wherein the routing policy data includes network routing policy that is provisioned using an interface to a network device, the method further comprising selecting the active routing policy data from the network routing policy.

8. The method of claim 5 further comprising:
   detecting a change in the routing policy data provisioned in the mobile device based on a change in location of the mobile device;
   re-evaluating the routing policy data to select updated active routing policy data; and
   creating updated first sets of marking rules and routing tables based on the updated active routing policy data.

9. The method of claim 1, wherein each routing table in the first set of routing tables indicates a single default route for a different one of the active network interfaces of the plurality of active network interfaces.

10. The method of claim 1, wherein each marking value indicates labeling that is other than an identifier for a particular endpoint.

11. The method of claim 1 further comprising:
    receiving a first packet from an application in the mobile device;
    determining to route the first packet without labeling the first packet according to a marking rule in the first set of marking rules; and
    routing the first packet using a routing table not included within the first set of routing tables corresponding to the first set of marking rules.

12. The method of claim 1, wherein at least one or more of the routing policy data provisioned in the mobile device are used to create the first set of marking rules indicates routing policy based on a type of application that generates the packets.

13. The method of claim 1 further comprising:
    receiving updated routing policy data for provisioning in the mobile device;
    creating an updated first set of marking rules based on the updated routing policy data; and
    creating an updated first set of routing tables corresponding to labeling indicated by the updated set of marking rules.

14. The method of claim 1 further comprising:
    detecting a change in the plurality of active network interfaces in the mobile device;
    creating, in response to the detecting, an updated first set of marking rules based on the changed plurality of active network interfaces;
    creating, in response to the detecting, an updated first set of routing tables corresponding to labeling indicated by the updated set of marking rules.

15. A mobile device configured for policy-based routing, the mobile device comprising:
    a memory component configured to store provisioned routing policy data;
    a processor coupled to the memory component, wherein the processor is configured to:
    create a first set of marking rules based on the routing policy data provisioned in the mobile device, wherein each marking rule in the first set of marking rules indicates labeling for packets, wherein each marking rule in the first set of marking rules indicates a different marking value for applying to the packets, and wherein the labeling is applied to the packets and used in selecting one of a plurality of different active network interfaces in the mobile device to route the packets over a set of access networks available to the mobile device, wherein each marking rule in the first set of marking rules is used to select a different one of the active network interfaces of the plurality of different active network interfaces; and
    create a first set of routing tables corresponding to the labeling indicated by the first set of marking rules, wherein each routing table directs the mobile device to a corresponding different one of the active network interfaces of the plurality of different active network interfaces, and wherein each routing table in the first set of routing tables directs the mobile device to a different one of the active network interfaces of the plurality of active network interfaces based on a different one of the marking values indicated by the first set of marking rules.

16. The mobile device of claim 15, wherein the processor is further configured to:
    receive a first packet from an application in the mobile device; select a first marking rule from the first set of marking rules and apply the indicated labeling to the first packet;
    select a first routing table from the first set of routing tables based on the indicated labeling applied to the first packet; and
    route the first packet using an active network interface indicated by the first routing table.

17. The mobile device of 15, wherein the processor is further configured to:
    receive at least one of updated routing policy data for provisioning in the mobile device or an indication of a change to the plurality of active network interfaces in the mobile device;
    create an updated first set of marking rules; and
    create an updated first set of routing tables corresponding to labeling indicated by the updated set of marking rules.

18. The mobile device of claim 15 further comprising at least one of:
    a user interface configured for receiving user routing policy used to provision the routing policy data; and
    an interface to a network device configured for receiving network routing policy used to provision the routing policy data;
    wherein the processor is further configured for selecting active routing policy data from at least one of the user or network routing policy and to create the first sets of marking rules and routing tables.

* * * * *